J. A. CORREA.
Scissors.
No. 135,692.  Patented Feb. 11, 1873.
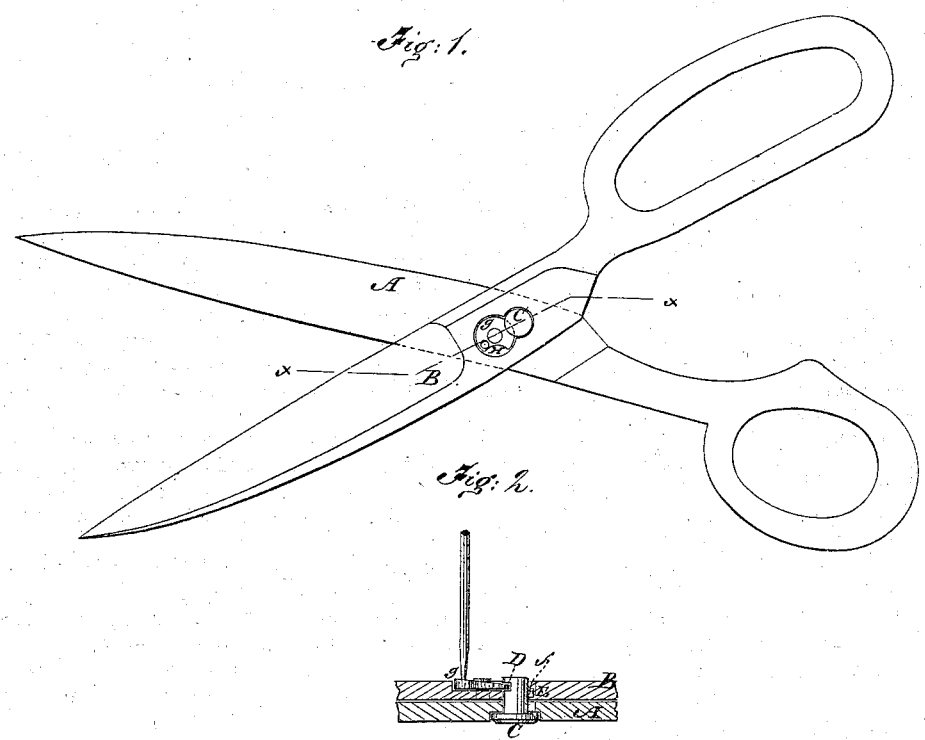
Witnesses:  Inventor:

UNITED STATES PATENT OFFICE.

JOHN A. CORREA, OF GREEN BAY, WISCONSIN.

IMPROVEMENT IN SCISSORS.

Specification forming part of Letters Patent No. 135,692, dated February 11, 1873.

*To all whom it may concern:*

Be it known that I, JOHN A. CORREA, of Green Bay, in the county of Brown and State of Wisconsin, have invented a new and useful Improvement in Scissors, of which the following is a specification:

The object of this invention is to provide convenient and efficient means for securing the blades of scissors or shears together, so that they may be adjusted at pleasure to work tightly or loosely without the use of a screw or nut; and it consists in one or more cam-wheels working in combination with the fulcrum-pin, as hereinafter shown and described.

In the drawing, Figure 1 represents a shears with the blades connected according to my invention. Fig. 2 is a section of Fig. 1 taken on the line $x\,x$.

Similar letters of reference indicate corresponding parts.

A and B are the blades of the shears. C is the fulcrum-pin, which passes through both blades the same as the rivet or screw-bolt of ordinary shears and scissors. Near the end of this pin is a transverse slot, D, and on its side near the head is a little lug, E, which enters a recess, F, in the blade, as seen in Fig. 2. This prevents the pin from turning in the blades. The head of the pin is sunk in the blade A, as represented, so that it is nearly flush with the surface of the blade. $g$ is a cam-wheel or circular inclined plane, secured by a central rivet or screw in a recess of the blade B. This wheel or disk is thinner upon one edge than the other, and it is arranged so that it enters the transverse slot D in the fulcrum-pin, and works like a cam or inclined plane bearing against the upper side of the slot, and thereby drawing the blades together. To allow the wheel or disk to enter the slot, and the pin to be withdrawn, there is a circular recess, H, in the thin edge of the wheel. When the wheel is turned the inclined plane bears against the upper edge of the slot and draws the pin upward and the blades together. This wheel is turned by means of a pin or any sharp-pointed instrument, as seen in the drawing.

When the cam-wheel is turned and the blades properly adjusted, the fulcrum-pin will remain stationary; but the blades may be tightened, loosened, or separated at any time with the greatest ease.

For shears of large size, two or more of these cam-wheels may be employed.

The same device may be employed on shears for cutting tin and other sheet metals.

Having thus described my invention, I claim as new and desire to secure by Letters Patent—

1. One or more cam-wheels, $g$, in combination with the pivot-pin of scissors or shears, when the same is made to operate upon the blades, substantially as and for the purposes described.

2. The slot D in the fulcrum-pin of shears or scissors, as and for the purposes described.

3. The lug E on the pin and the recess F in the blade, as and for the purposes described.

JOHN A. CORREA.

Witnesses:
G. A. LAWTON,
DAVID CURTIN.